Oct. 13, 1959 W. R. APBLETT ET AL 2,908,805
AUTOMATIC WELDING TORCHES
Filed Dec. 26, 1957 4 Sheets-Sheet 1

INVENTORS
WILLIAM R. APBLETT
JOHANNES A. WEDEKIND
BY
ATTORNEY

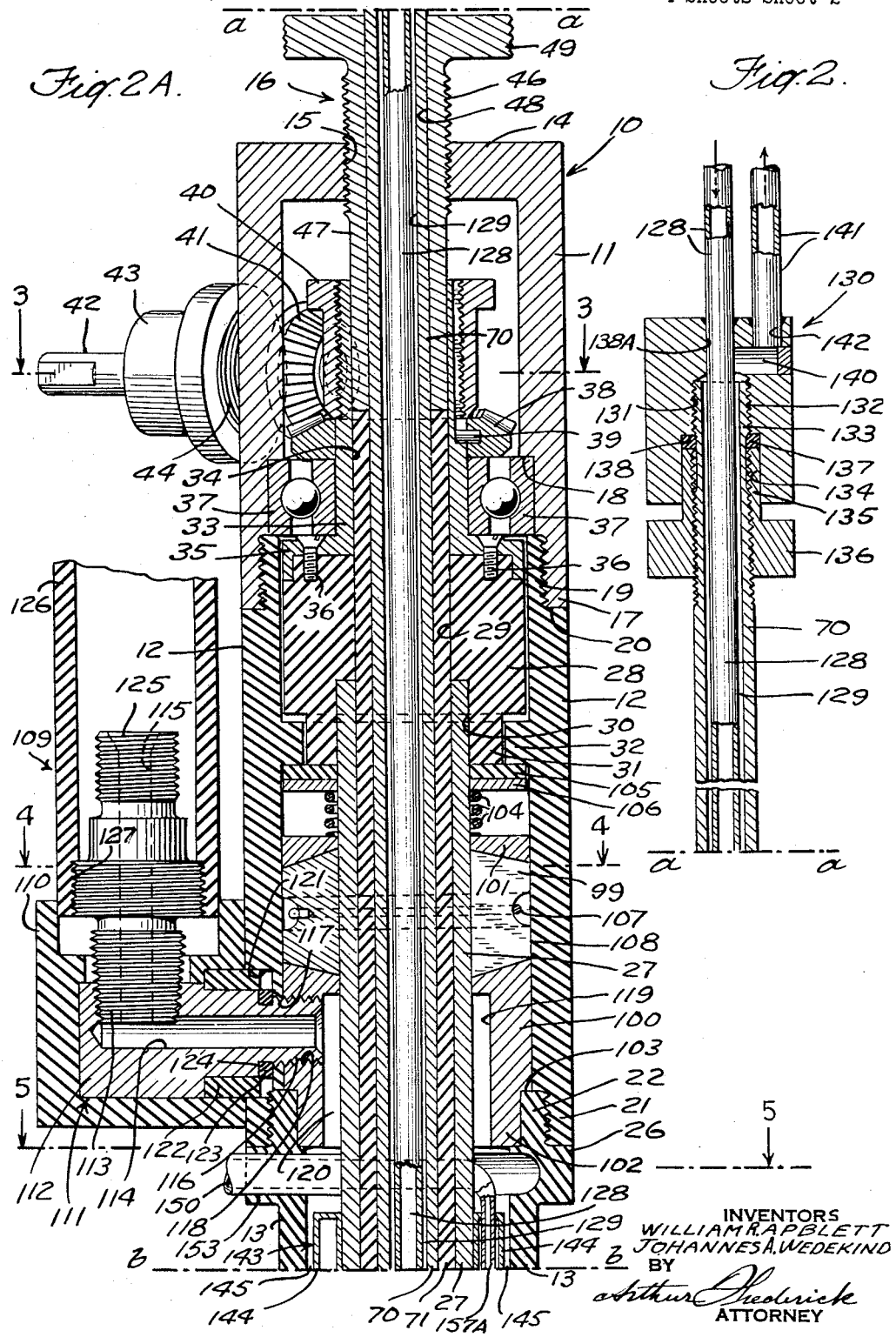

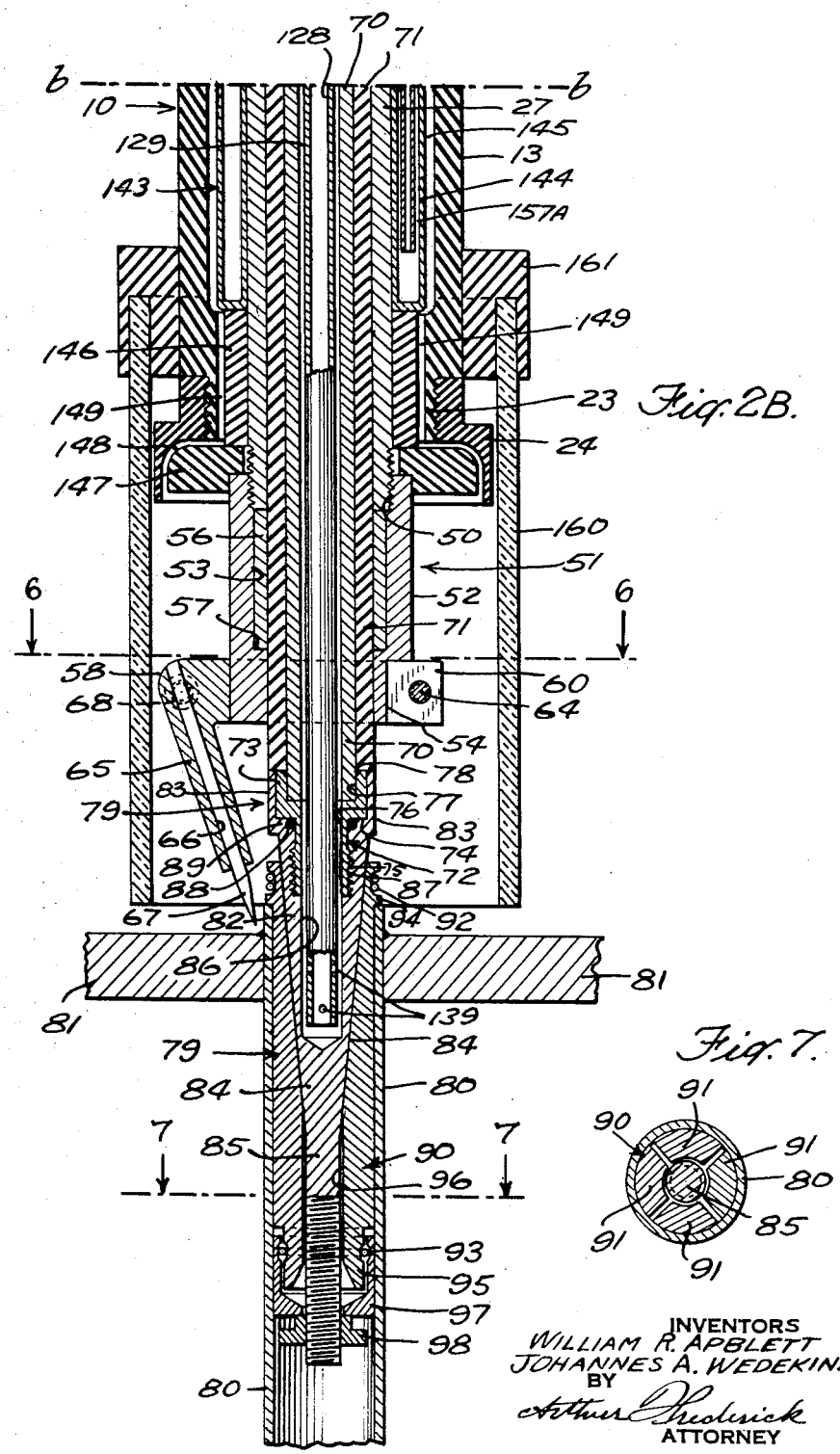

INVENTORS
WILLIAM R. APBLETT
JOHANNES A. WEDEKIND
BY
Arthur Frederick
ATTORNEY

United States Patent Office 2,908,805
Patented Oct. 13, 1959

2,908,805

AUTOMATIC WELDING TORCHES

William R. Apblett, Metuchen, N.J., and Johannes A. Wedekind, Los Altos, Calif., assignors to Foster Wheeler Corporation, New York, N.Y., a corporation of New York Application December 26, 1957, Serial No. 705,178

15 Claims. (Cl. 219—125)

This invention relates to welding apparatus and more particularly to an automatic welding torch for welding a tube to a plate, such as a tube sheet.

Heretofore, automatic welding torches for welding tubes to tube sheets have been relatively large, cumbersome devices and, therefore, unwieldy to operate. In addition, conventional automatic welding torches are unable to produce a welded joint between a relatively thin-walled tube and a relatively thick tube sheet of high strength and reliability as distinguished from what is characterized as a seal weld. The necessity of providing a reliable defect-free high strength weld is of particular importance in heat exchange units receiving high pressure fluids or fluids which are dangerous when they leak into other fluids. The major problem encountered in producing a high strength weld between relatively thin-walled tubes and a relatively thick tube sheet, is the application of sufficient heat to effect the melting of the tube material and the tube sheet material without burning through the tube wall adjacent to the point of weld. Another problem in producing a high strength weld arises from the oxidation film which forms on the molten metal of the weld upon contact with air which oxidizing action leads to weld porosity and thus a weak weld joint.

Accordingly, it is an object of the present invention to provide a fully automatic welding torch for welding tubes to tube sheets which torch is of relatively simple, compact construction and easy to operate.

Another object of this invention is to provide an automatic welding torch capable of providing a non-porous high strength weld between a relatively thin-walled tube and a relatively thick tube sheet.

A further object of this invention is to provide an automatic welding torch readily adapted for welding tubes of different diameters to tube sheets.

The present invention contemplates a novel automatic welding torch comprising a housing and a conductor tube disposed centrally within and in spaced relationship with the housing. The conductor tube is suitably supported at one end within the housing for rotation about its longitudinal axis and is rotatably driven by a driving means connected to a suitable source of rotary power. An electrode holder assembly having an axial bore is secured to the distal end of the conductor tube and is rotationally carried by the conductor. An electrode is adjustably supported by the electrode holder for proper positioning with respect to the work. Electrical contacts are secured within the housing in engagement with the conductor tube and are connected to a suitable source of electrical power to supply electric current to the electrode. The conductor tube rotates within the housing and around a centrally disposed core which extends through the axial bore of the electrode holder assembly and is electrically insulated from the conductor tube and electrode holder assembly. The end of the core, adjacent the electrode holder assembly, is provided with a support member which is constructed and arranged for insertion in a tube to be welded. The core is supported in the housing in such a manner as to be adjustable axially relative to the conductor tube and housing so that, when the support member is inserted in and properly engages the tube to be welded, the electrode carried by the conductor tube, may be positioned vertically with respect to the work. The core is provided with cooling fluid conducting means for providing a circulation of cooling fluid into the support member whereby heat, generated during the welding operation, is absorbed from the tube adjacent the weld and the possibility of burn through of the tube wall is minimized.

A gas shield is secured concentrically to the housing and extends over the electrode holder assembly to a point in close spaced relationship with the surface of the tube sheet to which a tube is to be welded. The gas shield is so dimensioned that the electrode holder assembly and electrode carried by the latter are free to rotate therewithin. The gas chamber, formed by the gas shield and housing, communicates with the annular space defined between the conductor tube and the housing. Connector means is provided in the housing for communicating the aforementioned annular space with a source of inert gas to provide a flow of inert gas to the gas chamber during the welding operation.

A means for receiving cooling fluid is disposed adjacent the conductor tube for absorbing from the conductor tube heat generated by the flow of current through the conductor tube.

Control means, well known in the art, is connected to the torch for controlling rotation of the conductor tube, flow of current to the electrode, flow of cooling fluid through the torch, and flow of inert gas to the chamber formed by the gas shield.

The invention will be more fully understood from the following detailed description thereof when considered in connection with the accompanying drawing in which:

Fig. 2 is a longitudinal section of the upper part of the welding torch joined to Fig. 2A on line *a—a*;

Fig. 2A is a longitudinal section through the middle portion of the welding torch joined to Fig. 2B on line *b—b*;

Fig. 2B is a longitudinal section through the lower portion of the welding torch.

Fig. 7 is a section taken along line 7—7 of Fig. 2B.

Figure 1:
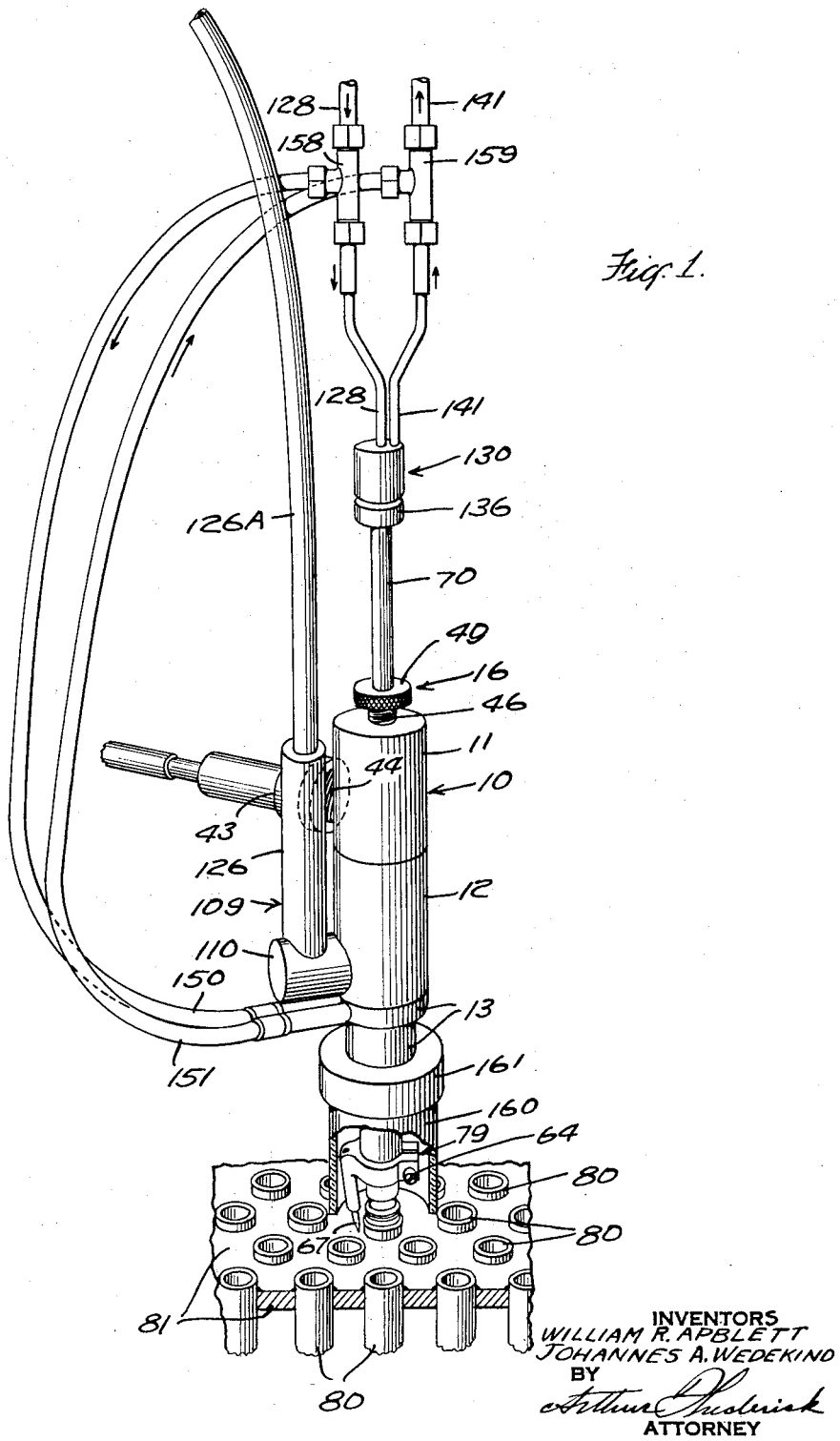
Fig. 1 is a perspective view of the welding torch according to this invention in position for welding and having parts broken away for illustration purposes.

Referring now to the drawings and more particularly to Figs. 1, 2, 2A and 2B, the reference numeral 10 designates the housing of the welding torch, which housing comprises an upper section 11, an intermediate section 12 and a lower section 13. As best shown in Fig. 2A, upper section 11 is a hollow cylindrical member which is open at its lower end and closed at the upper end by a wall 14. Wall 14 has a centrally disposed threaded opening 15 which is adapted to receive an adjustment screw 16. The lower end portion 17 of section 11 is of a larger inside diameter than the upper inside diameter of section 11 to form an internal annular shoulder 18. End portion 17 is internally threaded to a point in spaced relationship to shoulder 18. Intermediate section 12 is a hollow cylindrical member, open at both ends, and of substantially the same inside and outside diameters as section 11. Section 12 has an upper end portion 19 which is of reduced outside diameter to form an external shoulder 20, the reduced end portion 19 being externally threaded. The lower end portion 21 of section 12 is internally threaded. As best shown in Figs. 2A and 2B, lower section 13 is a hollow cylindrical member, open at both ends, and of slightly less outside and inside diameters than sections 11 and 12. The upper end portion 22 (Fig. 2A) of section 13 is externally threaded while the lower end portion 23 (Fig. 2B) is reduced and externally threaded to receive a gas deflector shield 24. Intermediate section 12 and lower section 13 are composed of suitable dielectric material, as for example, reinforced Bakelite, the purpose of which will be hereinafter explained.

Upper section 11 and intermediate section 12 are joined together by turning threaded end portion 19 of intermediate section 12 into threaded end portion 17 of section 11 until the lower end of section 11 impinges against shoulder 20 of section 12. Lower section 13 is joined to the intermediate section 12 by turning threaded end portion 22 of lower section 13 into the lower end portion 21 of intermediate section 12 until the lower end of section 12 butts against an external flange 26 which is disposed immediately adjacent the upper threaded end portion of lower section 13.

A tubular member 27 of suitable electrically conductive material, as for example copper, and hereinafter referred to as a conductor tube, is disposed coaxially in housing 10. Conductor tube 27 has an outside diameter substantially smaller than the inside diameter of housing 10 and is connected at its upper end to a spacer block 28 (Fig. 2A) which is of dielectric material, as for example, reinforced Bakelite.

Spacer block 28 has a central bore 29 and a counter-bored portion 30 which is adapted to receive the upper end portion of conductor tube 27. Spacer block 28 fits snugly but freely within the upper portion of section 12 of housing 10, the spacer block having a reduced lower end portion 31 which fits snugly but freely within a circular opening formed by an internal annular flange 32 of section 12.

Figure 3:
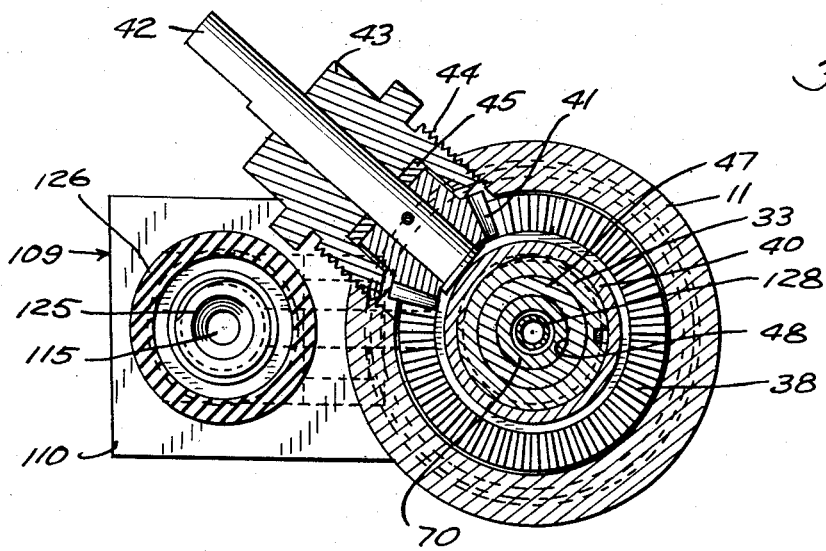
Fig. 3 is a transverse section taken along line 3—3 of Fig. 2A.

A cylindrical bearing 33 (Fig. 2A), having a centrally disposed bore 34 and an outwardly flanged end portion 35, is secured at the flanged end portion 35 to spacer block 28 by a plurality of peripherally spaced screws 36. A ball bearing assembly 37 is positioned on bearing 33 adjacent flanged portion 35 and in abutment at its outer race against shoulder 18 of section 11. Immediately above ball bearing assembly 37, a bevel gear 38 is secured to bearing 33 by pin 39. The upper end of bearing 33 is threaded for receiving a retainer nut 40 which butts against bevel gear 38. A bevel pinion gear 41 is disposed within section 11 of housing 10 in meshing relationship to bevel gear 38. As best shown in Fig. 3, pinion gear 41 is secured to the end of a drive shaft 42 which is rotatably supported by a bearing 43. Bearing 43 has a threaded portion 44 adapted for turning into a threaded opening in the wall of section 11. Interposed between pinion gear 41 and bearing 43 is a thrust washer 45. The end of drive shaft 42, opposite from the end carrying pinion gear 41, is suitably connected, as for example by a flexible cable, to a source of rotary power (not shown).

As shown in Fig. 2A, the shank 46 of adjustment screw 16 is partly threaded to provide a bare end portion 47 which extends into bore 34 of bearing 33. Screw 16 has a central bore 48 which extends through shank 46 and the knurled head 49 thereof.

Conductor tube 27 is of a length so that it extends from spacer block 28 through the housing to a point slightly beyond lower end portion 23 of lower housing section 13. As illustrated in Fig. 2B, the lower end portion of conductor tube 27 is externally threaded at 50 to receive and support thereon an electrode holder assembly 51.

Figure 6:
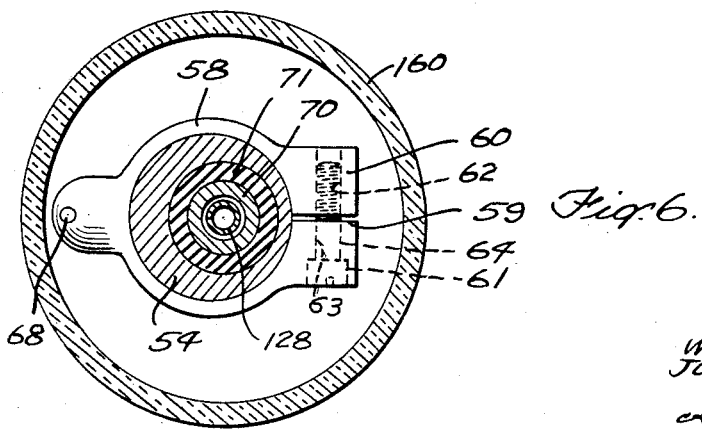
Fig. 6 is a section taken along line 6—6 of Fig. 2B.

Electrode holder assembly 51 comprises a cylindrical member 52, having an axial hole 53 therethrough and a reduced end portion 54 which is eccentrically formed with respect to the longitudinal axis of member 52, as best shown in Fig. 6. Member 52 is provided with internal threads, and as shown, is secured to conductor tube 27 by turning it upon threaded end portion 27 of the conductor tube until the end of the latter impinges against a bushing 56, which bushing is press fitted concentrically in member 52 with the lower end against an internal annular shoulder 57. A split collar 58 is mounted on reduced end portion 54 of member 52. As shown in Fig. 6, collar member 58 is split at 59 and is provided with a pair of adjacent ears 60 and 61. Ears 60 and ear 61 are each provided with a hole 62 and 63, respectively, which holes are in register with each other, and adapted to receive a bolt 64. Hole 62 is threaded so that when bolt 64 is turned into threaded hole 62, ears 60 and 61 are drawn together thereby clamping collar member 58 to eccentric end portion 54 of member 52. Collar member 58 is further provided with a depending arm 65 disposed diametrically opposite from ears 60 and 61 and projecting downwardly and inwardly toward an extension of the longitudinal axis of the conductor tube 27. Arm 65 has a longitudinal bore 66 which is adapted to receive therethrough an electrode 67. Electrode 67 extends beyond the lower end of arm 65 and is secured in a predetermined position by a set screw 68 disposed in the upper portion of arm 65.

A core or carrier tube 70 is disposed coaxially within conductor tube 27 and extends through bore 34 of bearing 33, bore 48 of screw 16 and through bushing 56 in axial hole 53 of member 52. Carrier tube 70 has an outside diameter of a dimension so as to freely but snugly fit within bore 48 of screw 16 and of such length as to project upwardly to a point substantially beyond head 49 of screw 16 and downwardly to a point slightly past collar member 52 of electrode holder assembly 51. Since the surface of bores 29 and 34 of spacer block 28 and bearing 33, respectively, and the inner surface of conductor tube 27 are coextensive, the outer surface of carrier tube 70 lies in spaced relationship to the aforesaid surfaces. An external sleeve 71 of suitable dielectric material is press fitted to carrier tube 70 and is of such wall thickness as to snugly fit within the space defined between carrier tube 70 and the inner surface of conductor tube 27 and the surfaces of bores 29 and 34. Sleeve 71 is dimensioned and secured to carrier tube 70, as shown in Fig. 2A, so that it abuts, at its upper end, the lower end of shank 46 of screw 16 and, at its lower end (Fig. 2B), terminates slightly short of the lower end of carrier tube 70. Sleeve 71 serves to electrically insulate carrier tube 70 from conductor tube 27 and the electrode holder assembly 51. At the lower end of the carrier tube 70, an adapter member 72 is secured.

Adapter member 72 (Fig. 2B) has an enlarged end portion 73 to provide an annular shoulder 74 and an externally threaded body 75. The adapter is provided with an axial bore 76 which is counter-bored at 77 in end portion 73 to receive the lower end portion of carrier tube 70 below sleeve 71. The axial bore 76 is of such diameter that the inner surface of the bore is coextensive with the inner surface of carrier tube 70. As shown, adapter member 72 may be secured, as by silver soldering at 78, to carrier tube 70. Threadably secured to adapter 72 is a pilot assembly 79, which as shown, is adapted for insertion in a tube 80 which is to be welded to a tube sheet 81.

Pilot assembly 79 comprises a shank 82 having a cylindrical head portion 83, an inverted frusto-conical portion 84 and an integral cylindrical portion 85 which is threaded adjacent its end. Shank 82 has an axial concavity or bore 86, the concavity or bore 86 being counter-bored and threaded at 87 to receive adapter member 72 therein. Interposed between shoulder 74 of adapter 72 and an inner annular shoulder 88 which is formed in concavity 86, is a gasket 89, preferably of the O-ring type.

Gasket 89 provides, when shank 82 is turned tightly upon threaded end portion 75 of adapter member 72 and is compressed, a fluid-tight joint between shank 82 and adapter member 72. A pilot member 90 is secured over shank 82. Pilot member 90 comprises a plurality of longitudinally extending segments 91 (Fig. 7) which are secured together at their upper end portions by a pair of resilient retaining rings 92 and at their lower end portions by a resilient retaining ring 93. Rings 92 are seated within an annular channel defined by spaced pairs of aligned ribs 94 on each of segments 91, while ring 93 is seated in aligned grooves formed in each of the reduced end portions 95 of segments 91. Segments 91 of pilot member 90 are so formed that, when assembled, an axially extending opening 96 is defined by the segments, the upper portion of which opening has a tapered surface complementary with the surfaces of the frustoconical portion 84 of shank 82 and a lower portion corresponding to the surface of cylindrical portion 85 of shank 82. The exterior surface of segments 91, when assembled, form a straight cylindrical wall surface of a diameter slightly smaller than the inside diameter of tube 80 so that it can be readily inserted in the latter. Pilot member 90 is disposed over shank 82 and is held thereon by a cup-shaped collar 97 which is slipped over the end of portion 85 of shank 82 and over the cylindrical end formed by reduced end portions 95 of segments 91. A lock nut 98 is turned upon the threaded end portion 85 of shank 82 and against collar 97 to thereby secure the pilot member 90 to the shank.

Electrical current is supplied to the torch by means of a segmented ring-shaped brush 99 (Figs. 2A and 4) which is dimensioned so as to receive conductor tube 27 therethrough and to fit within the space between conductor tube 27 and the inner surface of intermediate section 12 of housing 10. Brush 99 is held within section 12 between a cylindrical retainer block 100 and a retainer ring 101. Retainer block 100 has a reduced end portion 102 which forms a shoulder 103 so that block 100 seats within the upper end portion of section 13 with shoulder 103 in abutment against the upper end of section 13. Retainer ring 101 is disposed in section 12, above brush 99, and is biased against the upper surface of brush 99 by a spring 104. Spring 104 is disposed between retainer ring 101 and a pair of flat washers 105 and 106, which are disposed with washer 105 against flange 32 and the lower end of spacer block 28. The segments of brush 99 are held together and in positive engagement with conductor tube 27 by means of a retainer spring 107 which seats within an annular groove 108 which is formed by aligned grooves in each of the brush segments. To further insure positive electrical contact between brush 99 and conductor tube 27, as brush 99 wears, the upper and lower surfaces of the segments of brush 99 are tapered and the upper surface of retainer block 100 and the under surface of retainer ring 101 are provided with tapered surfaces complementary to the upper and lower surfaces of the segments of brush 99. The tapered contacting surfaces between block 100 and brush 99 and ring 101 and brush 99 effects a camming action which urges the segments of brush 99 inwardly against conductor tube 27. Brush 99 is connected in a suitable manner through section 12 of housing 10 to a suitable source of electrical power, not shown.

An inert gas inlet connection 109 is secured to intermediate section 12 of the housing adjacent brush 99. Gas inlet connection 109 consists of a body or housing 110 of suitable dielectric material, as for example reinforced Bakelite, in which is disposed an elbow assembly 111. Elbow assembly 111 comprises a horizontally extending member 112 and a vertically extending member 113 which is threadably secured within member 112. Member 112 is provided with an axially extending bore 114 which communicates at its outer end with an axial bore 115 which extends through member 113. Member 112 has a threaded end portion 116 which projects through an opening 117 in the wall of intermediate section 12 and is turned into a complementarily threaded hole 118 in retainer block 100. Block 100 has an opening to receive conductor tube 27 therein which is counter-bored at 119 to provide an annular gas passage 120 between the outer surface of conductor tube 27 and the surface of the counter-bored portion 119 of the opening in retainer block 100, the gas passage 120 communicating with bore 114 of horizontal elbow member 112 to receive inert gas from the latter. Opening 117 in the wall of section 12 is counterbored at 121 to receive a sealing bushing 122 which is disposed around member 112. A sealing ring 123 is disposed adjacent bushing 122 and around member 112 at the counterbored portion 121 so that, when member 112 is turned tightly within threaded opening 118 in retainer block 100, sealing ring 123 is compressed between a shoulder 124 of member 112 and the wall of section 12, thus providing a fluid-tight connection. Member 113 is threaded at its upper end 125 for connection with a gas conduit 126A (shown only in Fig. 1). A protective tube 126 is connected to member 113 at 127, which tube 126 extends coaxially with and over the gas conduit 126A.

To provide for removal of heat generated by the passage of current through conductor tube 27 and heat generated during the welding operation at the point of weld, a cooling fluid inlet conduit 128 is disposed coaxially within carrier tube 70. Inlet conduit 128 extends through carrier tube 70 into the concavity 86 of shank 82 and in spaced relationship to the bottom of concavity 86. Cooling fluid inlet conduit 128 has an outside diameter smaller than the inside diameter of carrier tube 70 so that an annular fluid return passage 129, communicating at one end with concavity 86, is defined between the outer surface of inlet conduit 128 and the inner surface of carrier tube 70, the purpose of which return passage will be hereinafter described.

As shown in Fig. 2, a plug 130 is disposed at the upper end of carrier tube 70. Plug 130 has a central opening 131 which is threaded at 132 to receive the threaded end portion 133 of carrier tube 70 and is enlarged at 134 to receive the shank 135 of a lock nut 136 which is turned upon threaded end 133 of carrier tube 70. A gasket 137 is disposed between the end of shank 135 of lock nut 136 and a shoulder 138 which is formed in opening 131 by enlarged portion 134 and opening 131. Turning lock nut 136 upon carrier tube 70 and into plug 130, gasket 137 is compressed between the end of the lock nut and shoulder 138 to thereby provide a fluid-tight connection between plug 130 and carrier tube 70. Plug 130 is provided with another central opening 138A which is coextensive with opening 131 and is of a diameter substantially equal to cooling fluid conduit 128 to snugly receive the latter therein. Plug 130 is provided with a lateral passage 140 which communicates at one end with annular return passage 129 and at the opposite end with a cooling fluid outlet or return conduit 141 which is secured in an opening 142 in the plug. Inlet conduit 128 and return conduit 141 are secured within their respective openings 138A and 142 in a fluid-tight manner, as for example, by silver soldering. The opposite end of inlet conduit 128 is connected to a source of cooling fluid (not shown) through a circulating means (not shown), as for example a pump, to receive cooling fluid. The fluid flows through feed conduit 128 (Fig. 2A) and discharges from the lower end of conduit 128 (Fig. 2B) and through a plurality of spaced openings 139 in the wall thereof into the bottom of concavity 86. Thereafter, the fluid flows upwardly in return passage 129 to lateral passage 140 (Fig. 2). From lateral passage 140, the heated cooling fluid flows into return conduit 141 and thence is discharged or cooled and recirculated for flow through feed conduit 128.

A second means for removing undesirable heat from the torch is provided in lower section 13 (Figs. 2A and 2B) of housing 10. This means comprises a cooling fluid jacket 143 consisting of a fluid-tight shell 144 through which cooling fluid is circulated. Shell 144 is disposed around the outer peripheral surface of conductor tube 27 and in spaced relationship with the inner surface of lower section 13 to provide an annular gas passage 145 communicating at its upper end with gas passage 120. As shown in Fig. 2B, shell 144 is supported by a bushing 146 which is disposed around conductor tube 27 beneath cooling fluid jacket 143. Bushing 146 is in turn supported by a gas deflector plate 147 which is secured against the lower end of bushing 146 by cylindrical member 52 of electrode holder assembly 51. Deflector plate 147 is dimensioned so as to fit within and in spaced relationship with deflector shield 24. The upper peripheral edge surface of deflector plate 147 is provided with a configuration corresponding to the adjacent surface of deflector shield 24 so that, when deflector plate 147 is held against the lower end of bushing 146, an annular gas passage 148 is formed between the adjacent surfaces of the deflector plate and deflector shield 24. Bushing 146 is dimensioned so that its outer surface lies in spaced relationship with the inner surface of lower section 12 to thereby define a gas passage 149 which communicates at one end with gas passage 145 and at the other end with gas passage 148.

Figures 4, 5:
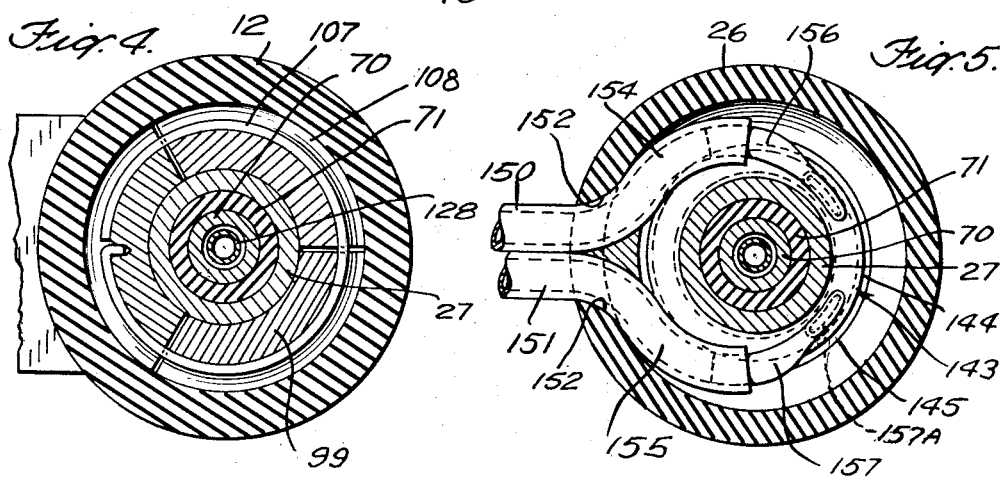
Fig. 4 is a transverse section taken along line 4—4 of Fig. 2A.
Fig. 5 is a section taken along line 5—5 of Fig. 2A.

As best shown in Figs. 2A and 5, a cooling fluid inlet tube 150 and a cooling fluid outlet or return tube 151 are each secured in a fluid-tight manner within openings 152 in the wall of lower section 13 at flange 26. Inlet tube 150 extends through opening 152 and is curved at 154 so as to extend partially around the outer surface of conductor tube 27. Similarly, return tube 151 is curved at 155 to extend partially around the opposite side of conductor tube 27. Inlet tube 150 and return tube 151 are each provided with a curved extension tube 156 and 157, respectively. Tubes 156 and 157 are each of reduced diameter and are secured at one end within the respective tubes 150 and 151. Tubes 156 and 157 extend from tube 150 and 151, around conductor tube 27, to a point in close spaced relationship to each other. Tube 156 has a depending end portion 157A of oval shape in cross section which extends, as shown in Fig. 2B, into shell 144 of cooling fluid jacket 143 to a point in relatively close spaced relationship with the bottom of the shell. Extension tube 156 of return tube 151 has a depending end portion of oval shape in cross section which is connected to the top wall of shell 144 and communicates with the interior of the shell at the top thereof.

As shown in Fig. 1, cooling fluid feed tube 150 is connected to receive cooling fluid from the same source (not shown) and circulating means (not shown) as inlet conduit 128 through a T-connection 158 which is interposed in conduit 128 upstream of plug 130. Return tube 151 is connected to deliver heated cooling fluid to return conduit 141 through a T-connection 159 which is connected in return conduit 141 downstream from plug 130. Without departing from the scope and spirit of this invention the feed tube 150 and return tube 151 of cooling fluid jacket 143 may be connected to a separate source of cooling fluid and discharge or recirculating means than inlet conduit 128 and return conduit 141.

Mounted on lower section 13 of housing 10, as best shown in Fig. 2B, is a hollow cylindrical gas shield 160 which is secured at its upper end portion in a ring 161, the ring being composed of yieldable material, such as machinable soft rubber. Ring 161 is suitably secured to the outer surface of lower section 13 of housing 10 so that the lower end of shield 160 lies in a plane slightly above the plane of the tops of the tubes to be welded. The inside diameter of shield 160 is slightly greater than the diameter of gas deflector shield 24 and is sufficiently large to permit free rotation of the electrode holder assembly 51 and electrode 67 within the chamber formed by shield 160. The shield 160 is preferably made of a heat resistant transparent material, as for example Pyrex, to enable an operator to observe the weld as it is being made.

In the operation of the torch hereindescribed, the pilot assembly 79 which comprises shank 82 and pilot member 90 is inserted, as shown in Figures 1 and 2B, in tube 80 which is to be welded to tube sheet 81. As best seen in Figure 2B, pilot member 90 is thrust in tube 80 until the lower ribs 94 of segments 91 of the pilot member impinges against the end of tube 80. Segments 91 of pilot member 90 are forced outwardly in tight engagement with the inner surface of tube 80 by the wedging action of frusto-conical portion 84 of shank 82 on the complementary tapered inner surfaces of segments 91. Pilot assembly 79, when firmly seated within tube 80, as aforedescribed, supports the torch in coextensive relationship with tube 80. The weight of the torch is transmitted through section 11 of housing 10 to adjustment screw 16 (Fig. 2A) and through adjustment screw 16 to insulating sleeve 71, carrier tube 70 and shank 82 of pilot assembly 79. The downward thrust exerted by the weight of the torch is transmitted through shank 82 to pilot member 90 and part of the downward thrust is converted into a horizontal component by the wedging action of shank 82 against segments 91 of pilot member 90. Thus, part of the weight of the torch assists in maintaining pilot assembly tightly within tube 80 while the remaining part of the weight is supported by tube 80 through ribs 94 of segments 91.

While pilot assembly 79 automatically positions the torch and its electrode 67 in proper welding relationship to the work (tube 80 and tube sheet 81), finer adjustment of the electrode can be effected. The vertical position of electrode 67, with respect to the point of weld, is accomplished by turning adjustment screw 16 in upper housing section 11. Turning screw 16 causes relative axial movement between carrier tube 70 and its sleeve 71 and the other parts comprising the torch through which tube 70 and its sleeve 71 extend. Since carrier tube 70 and sleeve 71 are held in fixed position by pilot assembly 79, the entire torch assembly is raised or lowered upon tube 70 and sleeve 71, depending upon the direction of rotation of screw 16, toward and away from tube 80 and tube sheet 81. Thus, electrode 67, which is carried by electrode holder assembly 51 and conductor tube 27, is accurately positioned vertically with respect to the point of weld by turning adjustment screw 16.

Horizontal adjustment of electrode 67 is effected by loosening bolt 64 in ears 60 and 61 of collar member 58 and rotating the latter upon eccentric end portion 54 of member 52. For example, rotating collar member 58 on eccentric 54 in a clockwise direction, as viewed in Fig. 6, arm 65 and electrode 67 is moved toward tube 78 and counterclockwise rotation of collar 58 from a position other than that shown in Fig. 6 will cause arm 65 and electrode 67 to move away from tube 78. In the same manner, the electrode may be properly positioned for different size tubes.

Rotational movement is imparted to electrode 67 by means of a source of rotary power (not shown) which is drivably connected to drive shaft 42. Drive shaft 42 (Fig. 2A) rotates pinion gear 41 which imparts rotation to gear 38 with which it meshes. Since gear 38 is keyed to bearing 133, bearing 133 is rotated about carrier tube 70 and its sleeve 71. Rotation of bearing 133 rotates spacer block 28 to which the bearing is secured by screws 36 in flanged end portion 35 of bearing 133 and, since the upper end of conductor tube 27 is secured to spacer block 28, conductor tube 27 is rotated about carrier tube 70 and its sleeve 71. Rotation of conductor tube 70 transmits rotation to electrode holder assembly 51 (Fig. 2B) which is secured to the distal end of the conductor tube 70, and rotation of electrode holder 51 carries electrode 67 in a circular path about tube 80.

Flow of electrical current to electrode 67 is accomplished by flow of electrical current from a source of electrical power (not shown) through an electric lead (not shown) to brush 99 whereby continuous flow of electric current to conductor tube 27 is effected as the latter rotates. Current flows downwardly through conductor tube 27 to cylindrical member 52 of electrode assembly 51, and thence through member 52 and collar 58 to electrode 67. The work (tube 80 and tube sheet 81) is suitably grounded so that the current will arc across the gap between the end of electrode 67 and the work. The heat generated by the electric arc across said gap melts the outer part of the tube wall and the tube sheet at the point of weld, thus fusing the tube and tube sheet together. Since spacer block 28 is of dielectric material, as well as housing sections 12 and 13 and gas connection housing 110, the exterior of the torch is rendered electrically safe.

To provide an inert atmosphere surrounding the work at the point of weld, inert gas from a suitable source thereof (not shown) is conducted through gas conduit 126A (Fig. 1) to member 113, at 125, of connection 109 (Fig. 2A). Gas then flows through bore 115 of member 113 into and through bore 114 of member 112. From bore 114, gas flows into annular passage 120 and thence downwardly into annular passage 145 which is defined by shell 144 of water jacket 143 and the inner surface of section 13. Gas then flows through annular passage 145 into and through annular gas passage 149 (Fig. 2B) and thence into gas passage 148. The gas upon leaving passage 149 impinges against deflector plate 147 and is deflected into passage 148, thereby causing reduction in the velocity of the gas. The gas discharges from passage 148 into the chamber formed by gas shield 160. Since the gas enters the aforesaid chamber at a reduced velocity, a non-turbulent flow of gas through the chamber and out from under the lower end of gas shield 160 is provided. The gas in flowing through passages, 120, 145 and 149 is heated by absorbing heat from conductor tube 27 and cooling fluid jacket 143 so that the gas upon contact with the work will not chill the molten metal.

To permit the generation of sufficient heat to melt tube sheet 81 to a depth necessary to provide a high strength weld and at the same time melt the wall of tube 78 without burning through the tube wall, cooling fluid, as for example, water, flows from a source of cooling fluid (not shown) through and downwardly in inlet conduit 128 (Figs. 1 and 2) and thence into the bottom of concavity 86 of shank 82 (Fig. 2B). The fluid then passes upwardly in annular passage 129, part of which passage is defined by the outer surface of conduit 128 and the surface of concavity 86. At plug 130 (Fig. 2) the fluid flows from passage 129 into lateral passage 140 thence into return conduit 141 and through the latter to a point of discharge or to a cooler and for recirculation through conduit 128. The continuous circulation of cooling fluid through concavity 86 of shank 82, during the welding operation, absorbs heat from the tube wall through segments 91 of pilot member 90. This absorption of heat from tube 80 permits the application, through the electric arc from electrode 64, of sufficient heat to effect the melting of the tube sheet to a desired depth and the melting of part of the wall of the tube without burning through the wall of tube 80, thereby producing a high strength weld.

Further cooling of the torch is achieved by flow of part of the cooling fluid passing through conduit 128, into feed tube 150 through T connection 158 in conduit 128 (Fig. 1). The cooling fluid passes through feed tube 150 into extension tube 156 and discharges from the depending end portion 157A into cooling fluid jacket 143. The heated cooling fluid, as best seen in Figs. 1 and 5, flows from cooling fluid jacket 143 through extension tube 156 and thence into and through return tube 151. From return tube 151, the cooling fluid passes into return conduit 141 through T connection 159 (Fig. 1) where it joins heated cooling fluid flowing through conduit 141 from the torch. The continuous flow of cooling fluid, through cooling fluid jacket 143, absorbs heat from conductor tube 27, which heat is generated by passage of electric current through conductor tube 27, thereby preventing overheating of the conductor tube.

The automatic operation of the torch is provided for by control apparatus (not shown) of well-known conventional design. The control apparatus coordinates rotation of electrode 67 with cooling fluid flow through conduits 128 and concavity 86 of pilot assembly 79, flow of cooling fluid through cooling fluid jacket 143, electric current flow to electrode 67, and inert gas flow to the chamber formed by gas shield 160.

If it is desired to weld a tube of a different diameter than tube 80 to a plate or tube sheet, pilot assembly 79 is first removed from the end of conductor tube 70 by turning shank 82 off threaded end 87 of adapter 72. A pilot assembly 79 is then selected of a size appropriate for the inside diameter of the tube to be welded and is turned upon and secured to adapter 72. Electrode 67 is then horizontally positioned with respect to the diameter of the new tube by rotation of collar 58 upon eccentric end portion 54 of member 52 (see Fig. 2B) in the manner heretofore described. By this procedure, the torch according to this invention may be quickly and easily adapted for welding tubes of different diameters.

From the foregoing description it is readily apparent that a welding torch is provided, that is of simple, compact construction and which can be quickly and easily positioned in relation to the tube to be welded. It is a torch which is particularly adapted to providing a uniform, defect-free, high-strength weld between a thin-walled tube and a relatively thick plate without danger of burn through of the tube wall. Furthermore, the aforedescribed torch, requires no supporting structure other than the pilot assembly.

Although, but one embodiment of the invention has been illustrated and described in detail, it is to be expressly understood that the invention is not limited thereto. Various changes can be made in the arrangement of parts without departing from the spirit and scope of the invention, as the same will now be understood by those skilled in the art.

What is claimed is:

1. A welding torch for welding a tubular member to a plate, comprising a housing, a hollow elongated member supported for rotation about its longitudinal axis in the housing, said hollow elongated member carrying an electrode exteriorly of the housing and laterally of the longitudinal axis of the hollow elongated member, means in said housing for continuously supplying electric current to said elongated member and electrode as the elongated member rotates, a shaft supported by said housing and extending axially through said elongated member, said shaft being electrically insulated from said elongated member, said shaft having a support member constructed and arranged for engaging the tubular member to be welded and for supporting the torch with the electrode in spaced relationship to the tubular member and plate to be welded together, and means for rotating said elongated member within said housing and about said shaft so that said electrode is carried in a circular path about the tubular member to be welded.

2. A welding torch for welding a tubular member to a plate, comprising a housing, a hollow elongated member supported for rotation in the housing, an electrode carried by said elongated member exteriorly of the housing and laterally of the axis of rotation of the hollow elongated member, means for continuously supplying electric current to said elongated member and the electrode as the elongated member rotates, a shaft supported by said housing and extending axially through said elongated member, said shaft being electrically insulated from said elongated member, a support member secured to the end of said shaft and extending adjacent said electrode and in coextensive relationship with said shaft, said support member being constructed and arranged to engage said tubular member to be welded, and means for rotating said elongated member within said housing and about said shaft so that said electrode is carried in a circular path about the tubular member to be welded.

3. The torch in accordance with claim 2 having means coextensive with the housing for providing a gas chamber surrounding the electrode, and means for supplying said chamber with inert gas during the rotation of the electrode.

4. The torch in accordance with claim 2 wherein the shaft and support member are provided with means for circulating cooling fluid into and through the support member for removing a predetermining proportion of the heat generated by the arcing of electric current from the electrode to the tubular member to be welded from the latter.

5. A welding torch for welding a tubular member to a plate, comprising a housing, a tubular electrical conductor supported adjacent one end for rotation in the housing and extending outside the housing at the opposite end, an electrode carried on and electrically connected to the distal end of said tubular conductor in spaced relationship with the axis of rotation of the tubular conductor, electrical contact means disposed in said housing and in engagement with said tubular conductor for transmitting a continuous flow of electrical current to the tubular conductor during the latter's rotation, a hollow shaft disposed within and in coaxial relationship with said tubular conductor and insulated therefrom, said shaft being supported by the housing and extending through the tubular conductor, a support member secured to one end of said shaft and in coextensive relationship with the shaft, said support member being constructed and arranged for insertion in and for engagement with the tubular member to be welded, drive means for rotating the tubular conductor about said shaft so that said electrode is carried in a circular path around the tubular member to be welded, said support member having a concavity communicating with the interior of said shaft, and means for passing cooling fluid through said hollow shaft and into said concavity of the support member to thereby remove a predetermined proportion of the heat generated by the arcing of electric current from the electrode to the tubular member to be welded from the latter.

6. A welding torch for welding a tubular member to a plate, comprising a housing, a tubular electrical conductor supported adjacent one end for rotation in the housing and extending outside the housing at the opposite end, a non-depositing electrode, an electrode holder assembly secured to said opposite end of said tubular conductor, said electrode holder assembly having means for receiving and securing said electrode with the end thereof in close spaced relationship to the tubular member and plate to be welded together, said electrode holder assembly having an axial bore extending in coextensive relationship with the opening of said tubular conductor, a segmental brush disposed in said housing and in electrical engagement with said tubular conductor, said brush being electrically connected to receive a flow of electrical current from a source of electrical power, a hollow shaft disposed coaxially within said tubular conductor and extending through the bore of the electrode holder assembly, an electrical insulating sleeve disposed over said hollow shaft and between the outer surface of the shaft and inner surface of the conductor tube and surface of the axial bore of said electrode holder assembly, a pilot assembly comprising a tapered shank secured to the end of said hollow shaft adjacent the electrode holder assembly, a pilot member, consisting of a plurality of segments forming a cylindrical outer surface of slightly smaller diameter than the inside diameter of the tubular member to be welded for insertion in the latter, said segments having outwardly extending aligned shoulders for engaging the end of the tubular member to be welded to limit the projection of the segments into the tubular member, said segments being formed so as to define therebetween a central hole adapted to receive said shank therein and having tapered walls complementary to the tapered surface of said shank so that the segments are forced tightly against the inner surface of the tubular member upon axial movement of said shank into and relative to the pilot member, said shank having an axial concavity coextensive with inner surface of said hollow shaft, a cooling fluid conduit disposed coaxially within said hollow shaft and extending into the concavity of the shank to a point in spaced relationship to the bottom of said concavity, said cooling fluid conduit being spaced from the inner surface of said hollow shaft to provide an annular passageway communicating at one end with said concavity, said cooling fluid conduit being connected to a source of cooling fluid to pass cooling fluid into said concavity to absorb from the tubular member to be welded a predetermined proportion of the heat generated by the electric current arcing between the electrode and the tubular member, said annular passageway being in communication at its end opposite from said concavity to a return conduit to deliver heated cooling fluid to the latter, and a gear train in said housing, said gear train being drivably connected to source of rotary power and to said conductor tube to rotate the latter and the electrode holder assembly about the hollow shaft and the sleeve to thereby carry the electrode in a circular path about the tubular member to be welded.

7. A welding torch for welding a tubular member to a plate, comprising a housing, a hollow member supported at one end for rotation in the housing and extending from the housing at its distal end, said hollow member being an electrical conductor and carrying an electrode at the distal end, means for continuously supplying electric current to said hollow member and the electrode as the hollow member rotates, a shaft supported by said housing and extending coaxially through said hollow member and terminating adjacent said electrode, said shaft being electrically insulated from said hollow member, a support member secured to the end of the shaft adjacent the electrode and in co-extensive relationship to the shaft, said support member being constructed and arranged for insertion in and engagement with the tubular member to be welded to thereby support the torch in axial alignment with the tubular member, means for circulating cooling fluid through said shaft and support member to remove a predetermined proportion of the heat generated during welding from the tubular member to be welded, means for providing a gas chamber surrounding the electrode, other means for delivering inert gas to the gas chamber, and cooling fluid means disposed adjacent the hollow member for cooling the latter.

8. A welding torch for welding a tubular member to a plate, comprising a housing, a conductor tube supported at one end for rotation about its longitudinal axis in the housing and extending from the housing at its distal end, an electrode holder assembly secured to and in electrical contact with the distal end of said conductor tube, an electrode, said electrode holder assembly being constructed and arranged to secure the electrode in lateral spaced relationship with the longitudinal axis of the conductor tube, said electrode assembly having a bore extending in coextensive relationship to the interior of the conductor tube, electrical contact means in said housing and in electrical engagement with the conductor tube for receiving electrical current from a source of electrical power, a hollow shaft supported by said housing and extending coaxially through said conductor tube and said bore of the electrode holder assembly and terminating at one end adjacent the latter, said hollow shaft being insulated from said conductor tube and electrode holder assembly, a support member secured to the end of the shaft adjacent the electrode holder assembly and in coextensive relationship with said shaft, said support member being constructed and arranged for insertion in and in engagement with the end of said tubular member to be welded to thereby support the torch in axial alignment with the tubular member, said support member having an axial concavity communicating and coextensive with the interior of the shaft, a cooling fluid conduit disposed in spaced coaxial relationship with the interior surface of the shaft and the concavity of the support member to provide an annular cooling fluid passageway, said cooling fluid conduit being connected at one end to receive cooling fluid from a source thereof and at the other end communicating with said cooling fluid passageway in the concavity of the support member to deliver cooling fluid into said concavity and passageway for removing heat from said tubular member to be welded, wall means secured to the housing and overlying the electrode and electrode holder assembly to provide a gas chamber surrounding the electrode, means for receiving inert gas from a source thereof and for delivering inert gas to said gas chamber during the welding operation of the torch, and a cooling fluid means disposed in the housing adjacent the conductor tube for cooling the latter.

9. The welding torch according to claim 8 wherein the cooling fluid means comprises a fluid-tight shell disposed in the housing and extending around the outer surface of the conductor tube, said shell having an inlet connected to receive cooling fluid from a source thereof and an outlet connected to discharge heated cooling fluid.

10. The welding torch according to claim 8 wherein means for receiving and delivering inert gas to the gas chamber comprises a gas connector connected to a source of inert gas to receive inert gas from the latter, a gas passageway defined between the housing and the conductor tube communicating at one end with the gas connector to receive inert gas from the latter and at the opposite end with the gas chamber to discharge inert gas into said chamber.

11. The welding torch according to claim 8 wherein the support member comprises a shank secured to the end of said shaft in coextensive relationship to the shaft, a pilot member mounted on the shank and adapted for insertion in the tubular member to be welded, said shank and pilot member having cooperating adjacent surfaces so that upon axial movement of the shank relative to the pilot member the pilot member tightly engages the tubular member to be welded.

12. A welding torch for welding a tubular member to a plate, comprising a housing, a tubular electrical conductor supported adjacent one end for rotation in the housing and extending outside the housing at the opposite end, said tubular conductor being spaced from the inner surface of the housing to provide a gas passage between the outer surface of the tubular conductor and the inner surface of the housing, an electrode carried on and electrically connected to the distal end of said tubular conductor in spaced relationship with the axis of rotation of the tubular conductor, electrical contact means for receiving electric current from a source of electrical power and continuously transmitting electric current to said tubular conductor as the latter rotates, a shaft disposed within and in coaxial relationship with said tubular conductor and insulated therefrom, said shaft being supported by the housing and extending through the tubular conductor, a support member secured to the end of said shaft adjacent the distal end of said tubular conductor, said support member being constructed and arranged for insertion in and for engagement with the tubular member to be welded to support the torch in axial alignment with the tubular member to be welded, drive means for receiving rotary power from a source thereof and transmitting rotation to the tubular conductor so that said electrode is carried in a circular path about the tubular member to be welded, means in said shaft and said support member for circulating cooling fluid into and through the support member for removing a portion of the heat from the tubular member to be welded which is generated by arcing of electric current from the electrode to said tubular member, a gas connector secured to said housing and communicating at one end with a source of inert gas to receive inert gas and at the opposite end with said gas passage to deliver inert gas to the latter, and means for providing a gas chamber surrounding the electrode and communicating with said gas passage to receive therein inert gas from said gas passage so that an inert gas atmosphere is provided at the point of weld.

13. A method of providing a weld connection between a tube and a tube sheet of high strength comprising the steps of supporting an electrode in spaced relationship to the tube and the tube sheet to be welded together, rotating the electrode in a circular path about the tube to be welded, supplying sufficient electric current to said electrode as the electrode rotates about the tube to be welded to effect the melting of the tube sheet to a depth necessary to provide a high strength weld and melt part of the tube wall, flowing cooling fluid adjacent the tube at the point of weld to remove a portion of the heat from the tube to prevent burn through of the tube wall, and passing inert gas to the electrode to provide for welding in an inert gas atmosphere.

14. A method of providing a weld connection between a tube and tube sheet of high strength comprising the steps of supporting a non-depositing electrode in proper spaced relationship to the tube and tube sheet to be welded together to provide for arcing of electrical current from the end of the electrode to the juncture of the surfaces of the tube and tube sheet, continuously passing sufficient electric current to said electrode while the latter rotates about the tube to be welded to effect the melting of the tube sheet to a depth necessary to provide a high strength weld and melt part of the tube wall, flowing cooling fluid adjacent the inner surface of the tube at the point of weld to remove a portion of the heat from the tube to prevent burn through of the tube wall, passing inert gas to the electrode to provide for welding in an inert atmosphere, and flowing cooling fluid through the electrode support means to maintain the latter relatively cool.

15. A welding torch for welding a tubular member to a plate, comprising a housing, a hollow member supported for rotation about its axis in said housing, said hollow member carrying an electrode, means in said housing for continuously supplying electric current to said hollow member and electrode as the hollow member rotates, a shaft supported by said housing and extending through said hollow member, said shaft being electrically insulated from said hollow member and having a support member constructed and arranged for engaging the tubular member to be welded and for supporting the torch with the electrode in spaced relation to the tubular member and plate to be welded together, and means for rotating said hollow member about said shaft so that said electrode is carried in a circular path about the tubular member to be welded.

References Cited in the file of this patent

UNITED STATES PATENTS

| 1,259,842 | Fischer | Mar. 19, 1918 |
| 1,949,251 | Gilbert | Feb. 27, 1934 |
| 2,468,806 | Pilia | May 3, 1949 |
| 2,818,493 | Pilia et al. | Dec. 31, 1957 |